US011949892B2

(12) United States Patent
Lin et al.

(10) Patent No.: US 11,949,892 B2
(45) Date of Patent: Apr. 2, 2024

(54) CONTENT-ADAPTIVE ONLINE TRAINING FOR DNN-BASED CROSS COMPONENT PREDICTION WITH LOW-BIT PRECISION

(71) Applicant: TENCENT AMERICA LLC, Palo Alto, CA (US)

(72) Inventors: Sheng Lin, San Jose, CA (US); Wei Jiang, Sunnyvale, CA (US); Wei Wang, Palo Alto, CA (US); Shan Liu, San Jose, CA (US); Xiaozhong Xu, State College, PA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 58 days.

(21) Appl. No.: 17/825,591

(22) Filed: May 26, 2022

(65) Prior Publication Data

US 2022/0400273 A1   Dec. 15, 2022

Related U.S. Application Data

(60) Provisional application No. 63/210,751, filed on Jun. 15, 2021.

(51) Int. Cl.
*H04N 19/42* (2014.01)
*G06N 3/08* (2023.01)
*H04N 19/186* (2014.01)

(52) U.S. Cl.
CPC ............ *H04N 19/42* (2014.11); *G06N 3/08* (2013.01); *H04N 19/186* (2014.11)

(58) Field of Classification Search
CPC ......... H04N 19/42; H04N 19/186; G06N 3/08
See application file for complete search history.

(56) References Cited

U.S. PATENT DOCUMENTS

2016/0321784 A1   11/2016   Annapureddy
2017/0230656 A1   8/2017    Leontaris et al.

FOREIGN PATENT DOCUMENTS

WO   WO-2022224113 A1 *   4/2021   ............ H04N 19/82
WO   WO-2022238967 A1 *   5/2021   ............ H04N 19/577

OTHER PUBLICATIONS

International Search Report dated Nov. 1, 2022 in International Application No. PCT/US22/31508.
Blanch et al., "Attention-Based Neural Networks for Chroma Intra Prediction in Video Coding", Journal of Selected Topics in Signal Processing, Oct. 2020, vol. No. 1, pp. 1-12 (12 pgs total).
Written Opinion dated Nov. 1, 2022 in International Application No. PCT/US22/31508.

* cited by examiner

*Primary Examiner* — Jae N Noh
(74) *Attorney, Agent, or Firm* — Sughrue Mion, PLLC

(57) ABSTRACT

A method and apparatus for neural network based cross component prediction with low-bit precision during encoding or decoding of an image frame or a video sequence, which may include reconstructing a chroma component based on a received luma component using a pre-trained deep neural network (DNN) cross component prediction (CCP) model for chroma prediction, and updating a set of parameters of the pre-trained DNN CCP model with low-bit precision. The method may also include generating an updated DNN CCP model for chroma prediction with low-bit precision based on at least one video sequence, and using the updated DNN CCP model for cross component prediction of the at least one video sequence at reduced processing time.

20 Claims, 7 Drawing Sheets

CONTENT-ADAPTIVE ONLINE TRAINING FOR DNN-BASED CROSS COMPONENT PREDICTION WITH LOW-BIT PRECISION

CROSS REFERENCE TO RELATED APPLICATION(S)

This application is based on and claims priority to U.S. Provisional Patent Application No. 63/210,751, filed on Jun. 15, 2021, the disclosure of which is incorporated by reference herein in its entirety.

FIELD

Embodiments of the present disclosure relate to neural network based cross component prediction during encoding or decoding images and/or video sequences.

BACKGROUND

Video coding and decoding reduce the redundancy in the input video signal, through compression. Compression, both lossless and lossy, can help reducing bandwidth or storage space requirements, in some cases by two orders of magnitude or more. Lossless compression refers to techniques where an exact copy of the original signal may be reconstructed from the compressed original signal. When using lossy compression, the reconstructed signal may not be identical to the original signal, but the distortion between original and reconstructed signal is small enough to make the reconstructed signal useful for the intended application. Lossy compression is widely employed in video encoding or decoding. The amount of distortion tolerated may depend on the application. As an example, users of certain consumer streaming applications may tolerate higher distortion than users of television contribution applications.

Traditional video coding standards, such as the H.264/Advanced Video Coding (H.264/AVC), High-Efficiency Video Coding (HEVC) and Versatile Video Coding (VVC) are designed on a similar (recursive) block-based hybrid prediction/transform framework where individual coding tools like the intra/inter prediction, integer transforms, and context-adaptive entropy coding, are intensively handcrafted to optimize the overall efficiency. Essentially, spatiotemporal pixel neighborhoods are leveraged for predictive signal construction, to obtain corresponding residuals for subsequent transform, quantization, and entropy coding. However, this approach fails to extract different levels of spatiotemporal stimuli by analyzing spatiotemporal information at various layers. Therefore, methods and apparatus that explore nonlinearity and nonlocal spatiotemporal correlations are needed for better compression efficiency and better compression quality.

SUMMARY

According to an aspect of the disclosure, a method for neural network (NN) based cross component prediction with low-bit precision during encoding or decoding may be provided. The method may include reconstructing a chroma component based on a received luma component using a pre-trained deep neural network (DNN) cross component prediction (CCP) model for chroma prediction; updating one or more parameters of the pre-trained DNN CCP model with low-bit precision; generating an updated DNN CCP model for chroma prediction with low-bit precision based on at least one video sequence; and using the updated DNN CCP model for cross component prediction of the at least one video sequence at reduced processing time.

According to an aspect of the disclosure, an apparatus for neural network (NN) based cross component prediction with low-bit precision during encoding or decoding may be provided. The apparatus may include at least one memory configured to store program code; and at least one processor configured to read the program code and operate as instructed by the program code. The program code may include reconstructing code configured to cause the at least one processor to reconstruct a chroma component based on a received luma component using a pre-trained DNN CCP model for chroma prediction; updating code configured to cause the at least one processor to update one or more parameters of the pre-trained DNN CCP model with low-bit precision; generating code configured to cause the at least one processor to generate an updated DNN CCP model for chroma prediction with low-bit precision based on at least one video sequence; and predicting code configured to cause the at least one processor to use the updated DNN CCP model for cross component prediction of the at least one video sequence at reduced processing time.

According to an aspect of the disclosure, a non-transitory computer readable medium for storing instructions for deep neural network (NN) based cross component prediction with low-bit precision during encoding or decoding may be provided. The instructions, when executed may cause the at least one processor to reconstruct a chroma component based on a received luma component using a pre-trained DNN CCP model for chroma prediction; update one or more parameters of the pre-trained DNN CCP model with low-bit precision; generate an updated DNN CCP model for chroma prediction with low-bit precision based on at least one video sequence; and use the updated DNN CCP model for cross component prediction of the at least one video sequence at reduced processing time.

BRIEF DESCRIPTION OF THE DRAWINGS

Further features, the nature, and various advantages of the disclosed subject matter will be more apparent from the following detailed description and the accompanying drawings in which.

DETAILED DESCRIPTION

As stated above, methods in related art may leverage spatiotemporal pixel neighborhoods for predictive signal construction, to obtain corresponding residuals for subsequent transform, quantization, and entropy coding. However, this approach fails to extract different levels of spatiotemporal stimuli by analyzing spatiotemporal information at various layers. Therefore, methods and apparatus that explore nonlinearity and nonlocal spatiotemporal correlations are needed for better compression efficiency and better compression quality.

Leveraging information from different components and additional side information, a non-neural network based encoder may predict the other components to achieve better compression performance. However, their performance fails in comparison to a neural network based encoder. As an example, the cross component linear prediction mode in intra-prediction fails to perform and well and be as efficient when compared with a deep neural network (DNN) based method.

A DNN is fundamentally programmed to extract different level of stimuli and has the capability of exploring highly nonlinearity and nonlocal correlations. This provides promising opportunity for high compression quality.

According to embodiments of the present disclosure, a content-adaptive online training with low-bit precision method for Cross Component Prediction (CCP) may be provided. Online training may include real-time training of one or more models. Embodiments may be based on Deep Neural Networks (DNN) for processing a video with adjusting the model's precision during the online training phase, improving the video compression quality for different video inputs by a series of processing.

Figure 1:
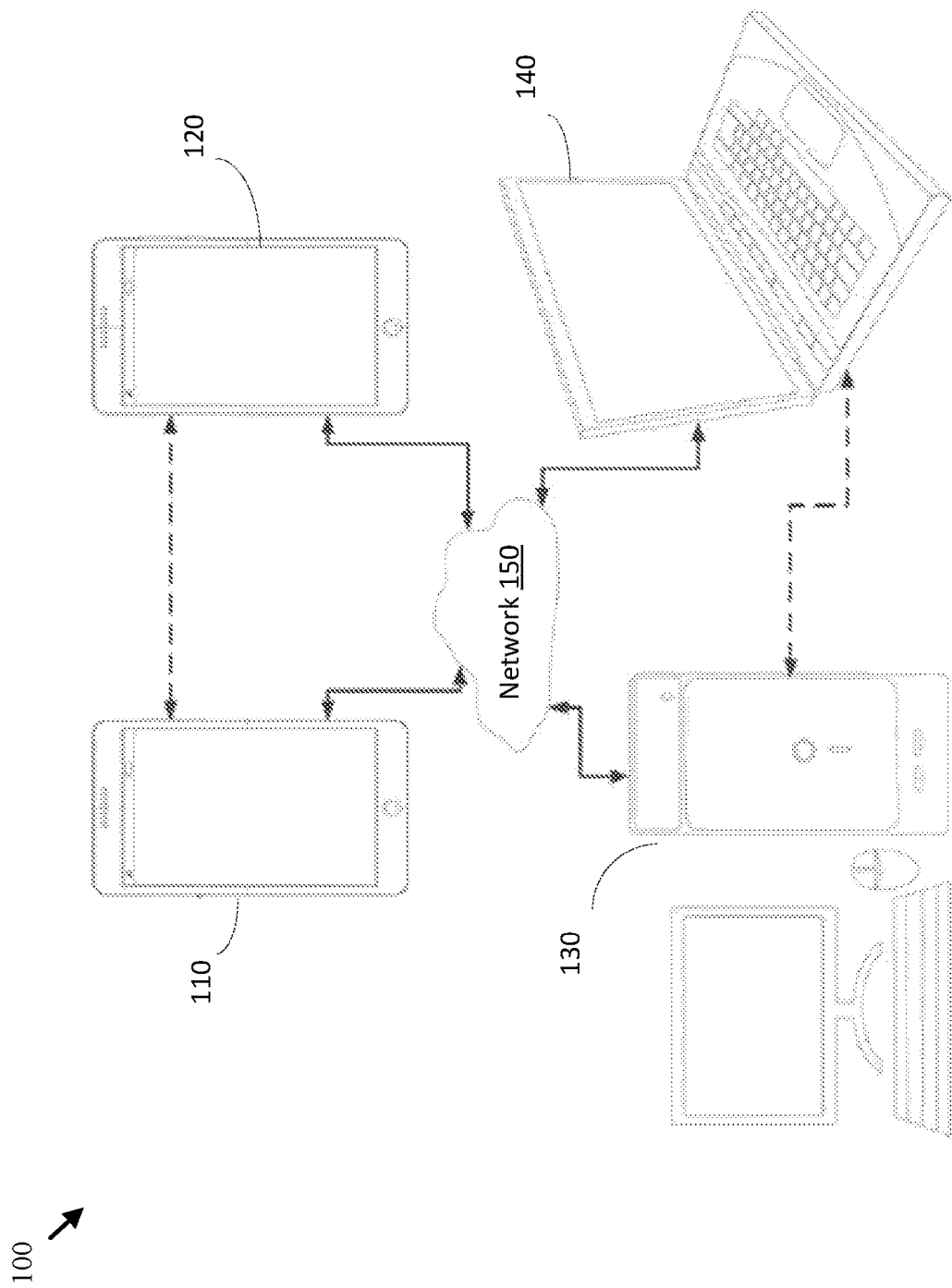
FIG. 1 is a simplified block diagram of a communication system, according to an embodiment.

FIG. 1 illustrates a simplified block diagram of a communication system (100) according to an embodiment of the present disclosure. The communication system (100) may include at least two terminals (140-130) interconnected via a network (150). For unidirectional transmission of data, a first terminal (140) may code video data at a local location for transmission to the other terminal (130) via the network (150). The second terminal (130) may receive the coded video data of the other terminal from the network (150), decode the coded data and display the recovered video data. Unidirectional data transmission may be common in media serving applications and the like.

FIG. 1 illustrates a second pair of terminals (110, 120) provided to support bidirectional transmission of coded video that may occur, for example, during videoconferencing. For bidirectional transmission of data, each terminal (110, 120) may code video data captured at a local location for transmission to the other terminal via the network (150). Each terminal (110, 120) also may receive the coded video data transmitted by the other terminal, may decode the coded data and may display the recovered video data at a local display device.

In FIG. 1, the terminals (140-120) may be illustrated as servers, personal computers and smart phones but the principles of the present disclosure are not so limited. Embodiments of the present disclosure find application with laptop computers, tablet computers, media players and/or dedicated video conferencing equipment. The network (150) represents any number of networks that convey coded video data among the terminals (140-120), including for example wireline and/or wireless communication networks. The communication network (150) may exchange data in circuit-switched and/or packet-switched channels. Representative networks include telecommunications networks, local area networks, wide area networks and/or the Internet. For the purposes of the present discussion, the architecture and topology of the network (150) may be immaterial to the operation of the present disclosure unless explained herein below.

Figure 2:
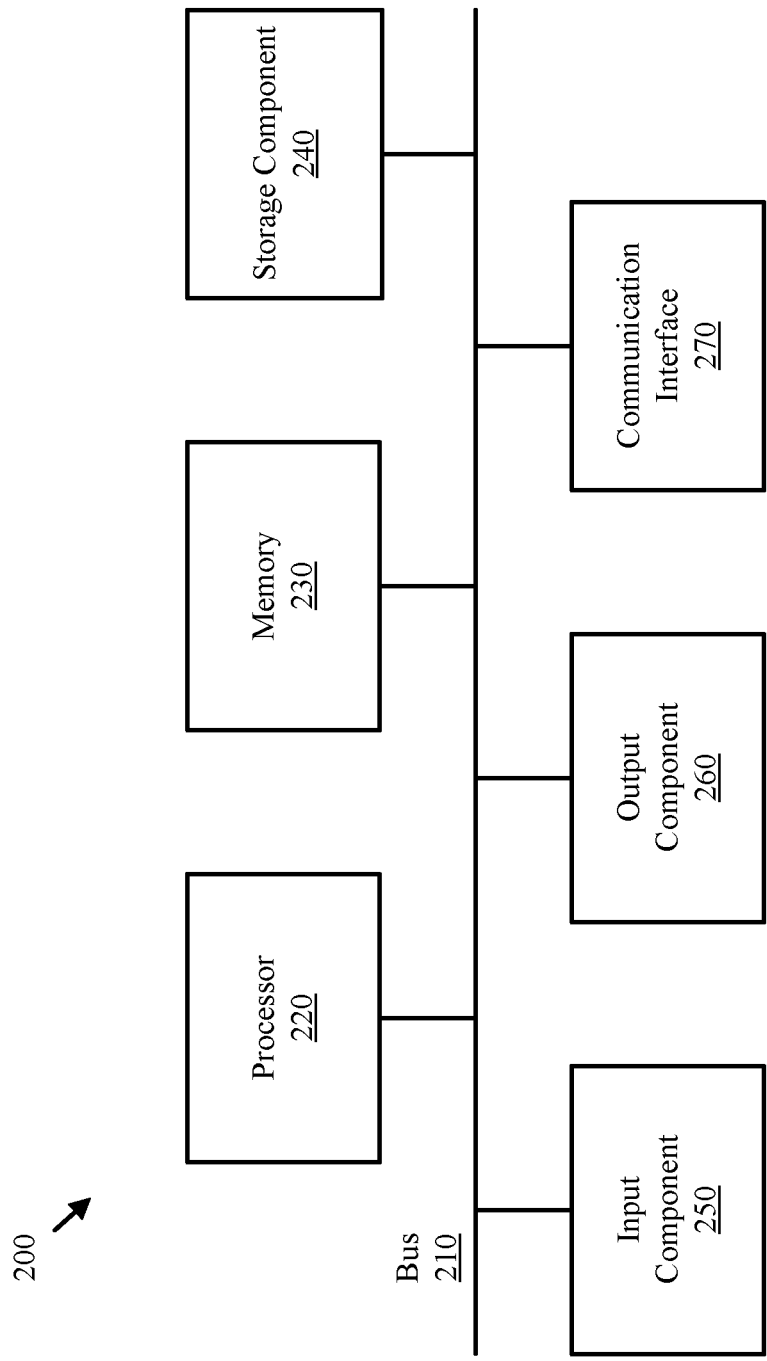
FIG. 2 is a block diagram of example components of one or more devices of FIG. 1.

FIG. 2 is a block diagram of example components of one or more devices of FIG. 1.

A device 200 may correspond to the any one of the terminals (110-140). As shown in FIG. 2, the device 200 may include a bus 210, a processor 220, a memory 230, a storage component 240, an input component 250, an output component 260, and a communication interface 270.

The bus 210 includes a component that permits communication among the components of the device 200. The processor 220 is implemented in hardware, firmware, or a combination of hardware and software. The processor 220 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, the processor 220 includes one or more processors capable of being programmed to perform a function. The memory 230 includes a random access memory (RAM), a read only memory (ROM), and/or another type of dynamic or static storage device (e.g., a flash memory, a magnetic memory, and/or an optical memory) that stores information and/or instructions for use by the processor 220.

The storage component 240 stores information and/or software related to the operation and use of the device 200. For example, the storage component 240 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

The input component 250 includes a component that permits the device 200 to receive information, such as via user input (e.g., a touch screen display, a keyboard, a keypad, a mouse, a button, a switch, and/or a microphone). Additionally, or alternatively, the input component 250 may include a sensor for sensing information (e.g., a global positioning system (GPS) component, an accelerometer, a gyroscope, and/or an actuator). The output component 260 includes a component that provides output information from the device 200 (e.g., a display, a speaker, and/or one or more light-emitting diodes (LEDs)).

The communication interface 270 includes a transceiver-like component (e.g., a transceiver and/or a separate receiver and transmitter) that enables the device 200 to communicate with other devices, such as via a wired connection, a wireless connection, or a combination of wired and wireless connections. The communication interface 270 may permit the device 200 to receive information from another device and/or provide information to another device. For example, the communication interface 270 may include an Ethernet interface, an optical interface, a coaxial interface, an infrared interface, a radio frequency (RF) interface, a universal serial bus (USB) interface, a Wi-Fi interface, a cellular network interface, or the like.

The device 200 may perform one or more processes described herein. The device 200 may perform these processes in response to the processor 220 executing software instructions stored by a non-transitory computer-readable medium, such as the memory 230 and/or the storage component 240. A computer-readable medium is defined herein as a non-transitory memory device. A memory device includes memory space within a single physical storage device or memory space spread across multiple physical storage devices.

Software instructions may be read into the memory 230 and/or the storage component 240 from another computer-readable medium or from another device via the communication interface 270. When executed, software instructions stored in the memory 230 and/or the storage component 240 may cause the processor 220 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 2 are provided as an example. In practice, the device 200 may include additional components, fewer components, different components, or differently arranged components than those shown in FIG. 2. Additionally, or alternatively, a set of components (e.g., one or more components) of the device 200 may perform one or more functions described as being performed by another set of components of the device 200.

A video compression framework may be described as follows. An input video x may include a plurality of image frames $x_1, \ldots, x_T$, where T stands for total number of frames in a video. The frames may be partitioned into spatial blocks, each block can be partitioned into smaller blocks iteratively. Any suitable method for partitioning may be used. As an example, 3D tree coding (e.g. octree portioning) may be used. The partitioned blocks may contain both luma component and chroma component. During the intra-prediction process, the luma component may be predicted first, and then two chroma channels may be predicted later. According to embodiments, the prediction of both chroma channels may be generated jointly or separately. A reconstructed chroma component may be generated by DNN-based models in both encoder and decoder. In some embodiments, the reconstructed chroma component may be generated by DNN-based models only in the decoder.

According to embodiments, one or more processes including signal-processing, spatial or temporal filtering, scaling, weighted averaging, up-/down-sampling, pooling, recursive processing with memory, linear system processing, non-linear system processing, neural-network processing, deep-learning based processing, AI-processing, pre-trained network processing, machine-learning based processing, or their combinations can be used as modules, for pre-processing the image frames and/or post-processing the image frames.

Figure 3:
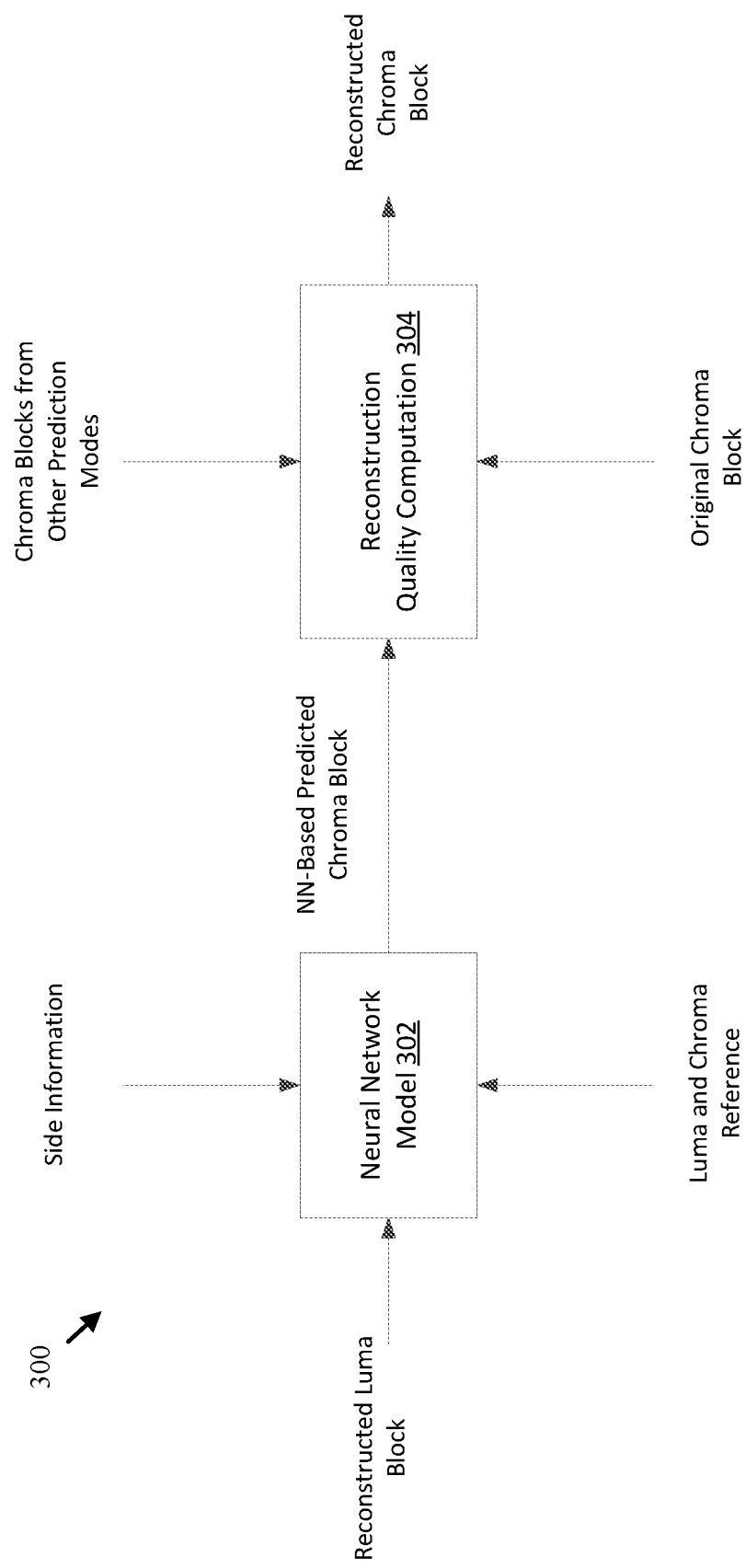
FIG. 3 is a diagram of an exemplary deep neural network (DNN) based cross component prediction with low-bit precision during encoding or decoding, according to an embodiment.

FIG. 3 is a block diagram of an exemplary deep neural network (DNN) based cross component prediction process (300) with low-bit precision during encoding or decoding, according to an embodiment. As shown in FIG. 3, process 300 may include a neural network model (302) and reconstruction quality computation (304).

Given a luma component (e.g., during encoding) or reconstructed luma component (e.g., during decoding), certain side information, or information associated with adjacent luma reference blocks and adjacent chroma reference blocks as the input of the neural network model (302) the neural network model (302) may be both trained and perform inferences jointly.

In some embodiments, the neural network model (302) may be a pre-trained model that is fine-tuned at time before or after encoding or decoding using the neural network model (302). In some embodiments, the neural network model (302) may be pre-trained but may be continuously updated during respective encoding or decoding by leveraging inference acceleration and continuous tuning. For continuous updating, in some embodiments, the neural network model (302) may be supported by customized hardware processors and may also be supported by lower precision floating point representations that those used during the training.

According to embodiments, additional side information may include image properties and information provided by the encoder, including but not limited to, luma component, block size, block component, quantization parameter (QP) value, etc.

The output of the neural network model (302) may be the predicted chroma component. The two chroma channels may use different neural network based models or use the same one. Embodiments of the present disclosure permit the combination, the concatenation or the order of how these components are used as the input can be changed arbitrarily.

The predicted chroma component may be used as an input to the reconstruction quality computation (304) to generate the reconstructed chroma block. In some embodiments, the reconstructed quality computation (304) may also use chroma blocks from other prediction modes as input. In some embodiments, the reconstruction quality computation (304) may receive the original chroma block associated with the reconstructed chroma block to determine the compression quality and determine whether one or more parameters of the neural network model need to be or may be updated, thus updating the neural network model.

According to an embodiment, by updating the partial (or entire) parameters of the pre-trained neural network based models with low-bit precision, better compression performance on one or several reconstructed components may be optimized for the input video. While the default model parameter precision is FP32 in most of current neural networks (some hardware may support FP64 model training), when it comes to inference phase, low-bit precision, such as FP16, INT8, INT4, INT2, and INT1 may be supported by specific hardware platforms. The low-bit precision may be a tradeoff between the compression performance and the total processing time.

To enhance the learning speed and accuracy of the neural network based cross component prediction model, some additional parameters may be added to the neural network based cross component prediction models disclosed herein. These one or more additional parameters may be added as learnable parameters during the initial training, fine-tuning, or the continuous tuning. During the training, the additional parameters may be learned by optimizing a rate-distortion loss based on the input video sequence.

According to one embodiment, the neural network based models for cross component prediction may be fine-tuned or may be continuously updated based on single video sequence. According to one embodiment, the neural network based models for cross component prediction may be fine-tuned or may be continuously updated based on a set of video sequences.

According to embodiments, the neural network based models may be pre-trained. In one embodiment, one or more parameters only in one layer or certain type of layers of the neural network model may be updated, and a new model generated. In other preferred embodiments, the parameters are updated on multiple or all layers of the neural network model. In one embodiment, only one or more bias terms/parameters may be optimized and updated with low-bit precision. In one embodiment, one or more weight (coefficient) terms/parameters may be optimized and updated with low-bit precision. In one embodiment, both one or more bias parameters and one or more weight terms/parameters may be jointly optimized or optimized together with low-bit precision.

At the end of the training and/or fine-tuning updated parameters may be computed. In an embodiment, the compression performance may be calculated between updated parameters and the existing pre-trained parameters. In an embodiment, the updated parameters are the fine-tuned parameters, i.e., the neural network model is updated with the fine-tuned parameters and may replace the existing pre-trained parameters. In other preferred embodiment, the updated parameters are some particular transforms of the fine-tuned parameters.

According to an embodiment, data compression may be performed on the updated parameters, for example, LZMA2 algorithm may be used for the compression of the updated parameters. In an embodiment, the compression may not performed.

When compared to the neural network based cross component prediction method as described herein cross component prediction method in intra prediction mode may have better compression quality. According to some embodiments, the one or more parameters to be optimized may be updated low-bit precision to improve the compression performance with specific video as online training's input. Additionally, by updating and/or fine-tuning the parameters with low-bit precision, the updated parameters are in low-bit precision which can speed up the inference process and reduce the processing time.

Figure 4:
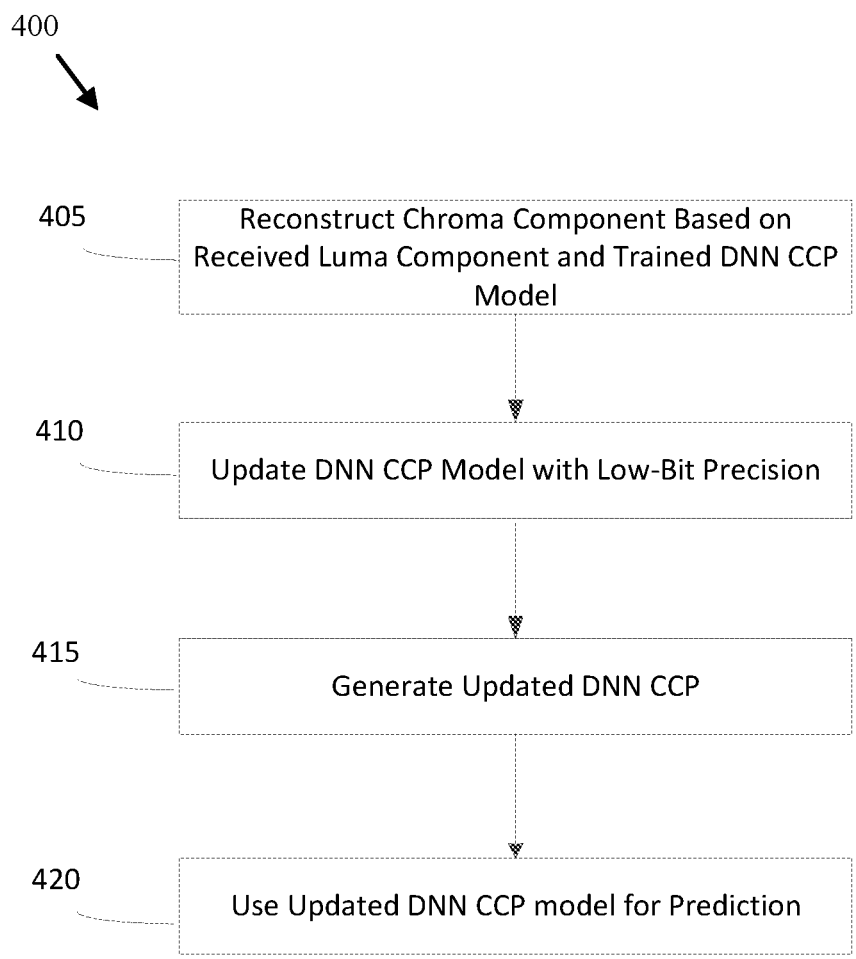
FIG. 4 illustrates a flowchart of method for deep neural network (DNN) based cross component prediction with low-bit precision during encoding or decoding, according to an embodiment.

FIG. 4 illustrates a flowchart of process 400 for deep neural network (DNN) based cross component prediction with low-bit precision during encoding or decoding. Process 400 may be performed using an encoder or a decoder or both.

At operation 405, a chroma component may be reconstructed based on a received luma component using a pre-trained deep neural network (DNN) cross component prediction (CCP) model for chroma prediction. The chroma component may be reconstructed based on the luma component using a pre-trained neural network model for chroma prediction. In some embodiments, at operation 405, a luma component may be received. In some examples, the luma component may be already reconstructed.

At operation 410, one or more parameters of the pre-trained DNN CCP model may be updated with low-bit precision.

At operation 415, the pre-trained neural network model for chroma prediction may be updated with low-bit precision. In some embodiments, the updating the pre-trained neural network model may include optimizing one or more parameters of the pre-trained neural network model with low-bit precision. In some embodiments, the updating the pre-trained neural network model for chroma prediction with low-bit precision further may include updating based on single video sequence or a set of video sequences.

A reconstructed chroma component may be generated based on the predicted chroma component and one or more chroma components coded using a set of prediction modes. According to embodiments, generating the reconstructed chroma component may be based on a quality computation of the predicted chroma component, wherein the quality computation of the predicted chroma component may be based on one or more chroma components from other prediction modes and an original chroma component associated with the predicted chroma component.

At operation 420, the updated DNN CCP model may be used for cross component prediction of the at least one video sequence at reduced processing time.

In some embodiments, the updating the pre-trained neural network model may include optimizing the one or more parameters from among one or more layers of the pre-trained neural network model with low-bit precision. In some embodiments, the one or more parameters being optimized with low-bit precision may include one or more bias parameters. In some embodiments, the one or more parameters being optimized with low-bit precision may include one or more weight parameters. In some embodiments, the one or more parameters being optimizer with low-bit precision may include joint optimization of one or more bias parameters and one or more weight parameters.

In some embodiments, the one or more layers may include one or more convolutional layers of the pre-trained neural network model. In some embodiments, the one or more layers may include a set of final layers of the pre-trained neural network model.

In some embodiments, the updating may include calculating a first compression performance of an updated neural network model including one or more parameters optimized with the one or more scaling factors, then calculating a second compression performance of the pre-trained neural network model including one or more pertained parameters; and based on a comparison of the first compression performance and the second compression performance being higher than a threshold, determine whether to update the pre-trained neural network model to include the one or more parameters optimized with the one or more scaling factors.

Figure 5:
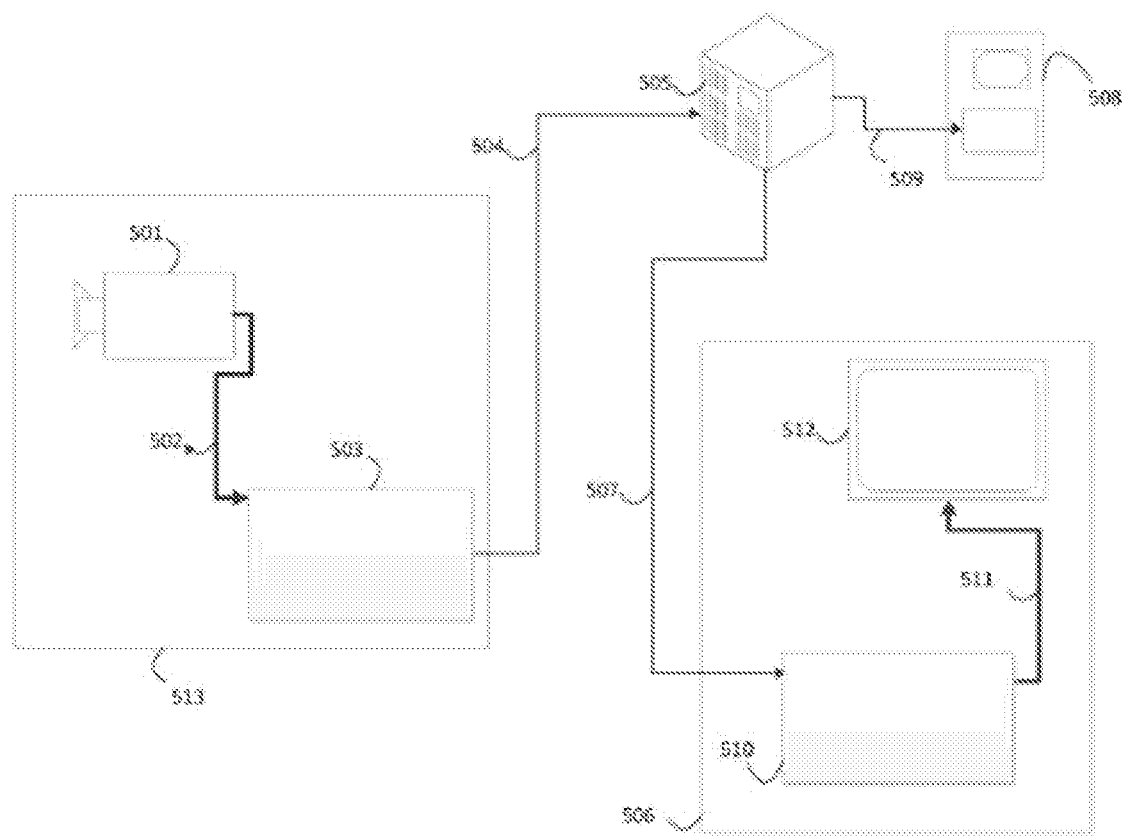
FIG. 5 is a diagram of a streaming environment, according to an embodiment.

FIG. 5 illustrates, as an example for an application for the disclosed subject matter, the placement of a video encoder and decoder in a streaming environment. The disclosed subject matter may be equally applicable to other video enabled applications, including, for example, video conferencing, digital TV, storing of compressed video on digital media including CD, DVD, memory stick and the like, and so on.

A streaming system may include a capture subsystem (513), that may include a video source (501), for example a digital camera, creating, for example, an uncompressed video sample stream (502). That sample stream (502), depicted as a bold line to emphasize a high data volume when compared to encoded video bitstreams, may be processed by an encoder (503) coupled to the camera (501). The encoder (503) may include hardware, software, or a combination thereof to enable or implement aspects of the disclosed subject matter as described in more detail below. The encoded video bitstream (504), depicted as a thin line to emphasize the lower data volume when compared to the sample stream, may be stored on a streaming server (505) for future use. One or more streaming clients (506, 508) may access the streaming server (505) to retrieve copies (507, 509) of the encoded video bitstream (504). A client (506) may include a video decoder (510) which decodes the incoming copy of the encoded video bitstream (507) and creates an outgoing video sample stream (511) that may be rendered on a display (512) or other rendering device (not depicted). In some streaming systems, the video bitstreams (504, 507, 509) may be encoded according to certain video coding/compression standards. Examples of those standards include H.265 HEVC. Under development is a video coding standard informally known as Versatile Video Coding (VVC). The disclosed subject matter may be used in the context of VVC.

Figure 6:
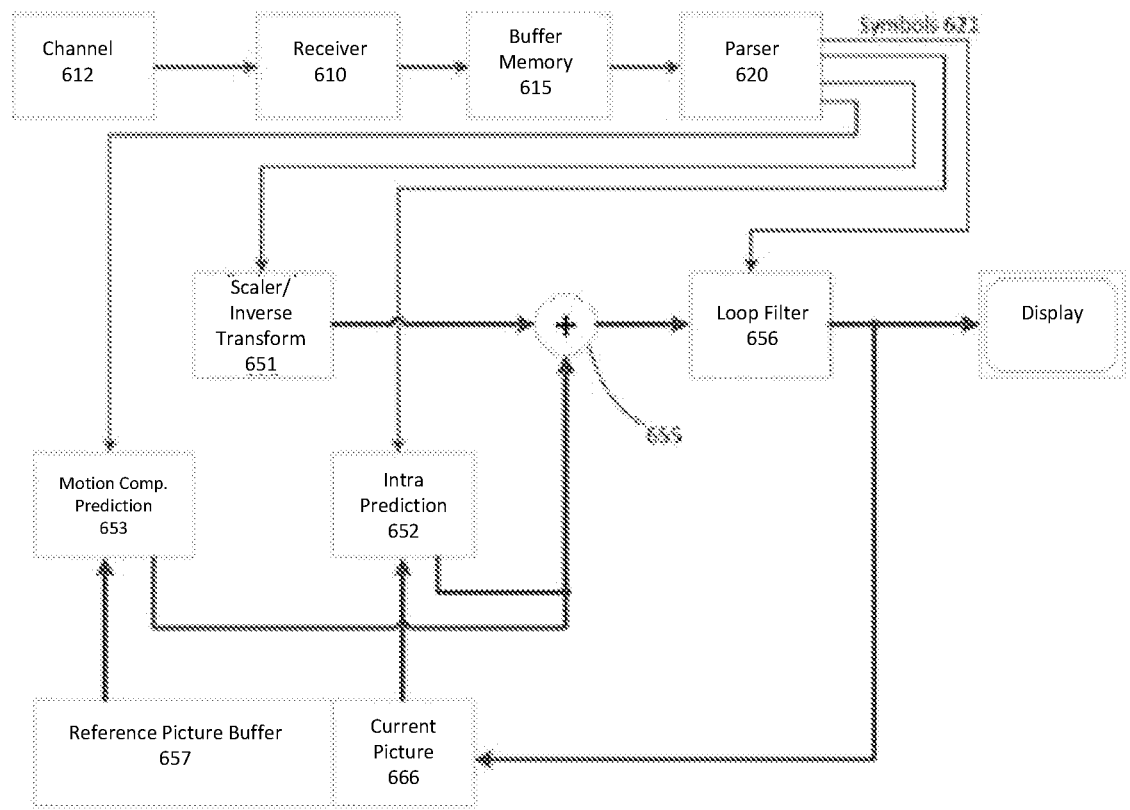
FIG. 6 is a block diagram of a video decoder, according to an embodiment.

FIG. 6 may be a functional block diagram of a video decoder (510) according to an embodiment of the present invention.

A receiver (610) may receive one or more codec video sequences to be decoded by the decoder (610); in the same or another embodiment, one coded video sequence at a time, where the decoding of each coded video sequence is independent from other coded video sequences. The coded video sequence may be received from a channel (612), which may be a hardware/software link to a storage device which stores the encoded video data. The receiver (610) may receive the encoded video data with other data, for example, coded audio data and/or ancillary data streams, that may be forwarded to their respective using entities (not depicted). The receiver (610) may separate the coded video sequence from the other data. To combat network jitter, a buffer memory (615) may be coupled in between receiver (610) and entropy decoder/parser (620) ("parser" henceforth). When receiver (610) is receiving data from a store/forward device of sufficient bandwidth and controllability, or from an isosychronous network, the buffer (615) may not be needed, or may be small. For use on best effort packet networks such as the Internet, the buffer (615) may be required, may be comparatively large and may advantageously of adaptive size.

The video decoder (510) may include a parser (620) to reconstruct symbols (621) from the entropy coded video sequence. Categories of those symbols include information used to manage operation of the decoder (510), and potentially information to control a rendering device such as a display (512) that is not an integral part of the decoder but may be coupled to it, as was shown in FIG. 6. The control information for the rendering device(s) may be in the form of Supplementary Enhancement Information (SEI messages) or Video Usability Information (VUI) parameter set fragments (not depicted). The parser (620) may parse/entropy-decode the coded video sequence received. The coding of the coded video sequence may be in accordance with a video coding technology or standard, and may follow principles well known to a person skilled in the art, including variable length coding, Huffman coding, arithmetic coding with or without context sensitivity, and so forth. The parser (620) may extract from the coded video sequence, a set of subgroup parameters for at least one of the subgroups of pixels in the video decoder, based upon at least one parameters corresponding to the group. Subgroups may include Groups of Pictures (GOPs), pictures, tiles, slices, macroblocks, Coding Units (CUs), blocks, Transform Units (TUs), Prediction Units (PUs) and so forth. The entropy decoder/parser may also extract from the coded video sequence information such as transform coefficients, quantizer parameter (QP) values, motion vectors, and so forth.

The parser (620) may perform entropy decoding/parsing operation on the video sequence received from the buffer (615), so to create symbols (621). The parser (620) may receive encoded data, and selectively decode particular symbols (621). Further, the parser (620) may determine whether the particular symbols (621) are to be provided to a Motion Compensation Prediction unit (653), a scaler/inverse transform unit (651), an Intra Prediction Unit (652), or a loop filter (656).

Reconstruction of the symbols (621) may involve multiple different units depending on the type of the coded video picture or parts thereof (such as: inter and intra picture, inter and intra block), and other factors. Which units are involved, and how, may be controlled by the subgroup control information that was parsed from the coded video sequence by the parser (620). The flow of such subgroup control information between the parser (620) and the multiple units below is not depicted for clarity.

Beyond the functional blocks already mentioned, decoder (510) may be conceptually subdivided into a number of functional units as described below. In a practical implementation operating under commercial constraints, many of these units interact closely with each other and may, at least partly, be integrated into each other. However, for the purpose of describing the disclosed subject matter, the conceptual subdivision into the functional units below is appropriate.

A first unit is the scaler/inverse transform unit (651). The scaler/inverse transform unit (651) receives quantized transform coefficient as well as control information, including which transform to use, block size, quantization factor, quantization scaling matrices, etc. as symbol(s) (621) from the parser (620). It may output blocks comprising sample values, that may be input into aggregator (655).

In some cases, the output samples of the scaler/inverse transform (651) may pertain to an intra coded block; that is: a block that is not using predictive information from previously reconstructed pictures, but may use predictive information from previously reconstructed parts of the current picture. Such predictive information may be provided by an intra picture prediction unit (652). In some cases, the intra picture prediction unit (652) generates a block of the same size and shape of the block under reconstruction, using surrounding already reconstructed information fetched from the current (partly reconstructed) picture (666). The aggregator (655), in some cases, adds, on a per sample basis, the prediction information the intra prediction unit (652) has generated to the output sample information as provided by the scaler/inverse transform unit (651).

In other cases, the output samples of the scaler/inverse transform unit (651) may pertain to an inter coded, and potentially motion compensated block. In such a case, a Motion Compensation Prediction unit (653) may access reference picture memory (657) to fetch samples used for prediction. After motion compensating the fetched samples in accordance with the symbols (621) pertaining to the block, these samples may be added by the aggregator (655) to the output of the scaler/inverse transform unit (in this case called the residual samples or residual signal) so to generate output sample information. The addresses within the reference picture memory form where the motion compensation unit fetches prediction samples may be controlled by motion vectors, available to the motion compensation unit in the form of symbols (621) that may have, for example X, Y, and reference picture components. Motion compensation also may include interpolation of sample values as fetched from the reference picture memory when sub-sample exact motion vectors are in use, motion vector prediction mechanisms, and so forth.

The output samples of the aggregator (655) may be subject to various loop filtering techniques in the loop filter unit (656). Video compression technologies may include in-loop filter technologies that are controlled by parameters included in the coded video bitstream and made available to the loop filter unit (656) as symbols (621) from the parser (620), but may also be responsive to meta-information obtained during the decoding of previous (in decoding order) parts of the coded picture or coded video sequence, as well as responsive to previously reconstructed and loop-filtered sample values.

The output of the loop filter unit (656) may be a sample stream that may be output to the render device (512) as well as stored in the reference picture memory (666) for use in future inter-picture prediction.

Certain coded pictures, once fully reconstructed, may be used as reference pictures for future prediction. Once a coded picture is fully reconstructed and the coded picture has been identified as a reference picture (by, for example, parser (620)), the current reference picture (666) may become part of the reference picture buffer (657), and a fresh current picture memory may be reallocated before commencing the reconstruction of the following coded picture.

The video decoder (510) may perform decoding operations according to a predetermined video compression technology that may be documented in a standard, such as H.265 HEVC. The coded video sequence may conform to a syntax specified by the video compression technology or standard being used, in the sense that it adheres to the syntax of the video compression technology or standard, as specified in the video compression technology document or standard and specifically in the profiles document therein. Also necessary for compliance may be that the complexity of the coded video sequence is within bounds as defined by the level of the video compression technology or standard. In some cases, levels restrict the maximum picture size, maximum frame rate, maximum reconstruction sample rate (measured in, for example megasamples per second), maximum reference picture size, and so on. Limits set by levels may, in some cases, be further restricted through Hypothetical Reference Decoder (HRD) specifications and metadata for HRD buffer management signaled in the coded video sequence.

In an embodiment, the receiver (610) may receive additional (redundant) data with the encoded video. The additional data may be included as part of the coded video sequence(s). The additional data may be used by the video decoder (510) to properly decode the data and/or to more accurately reconstruct the original video data. Additional data may be in the form of, for example, temporal, spatial, or signal-to-noise ratio (SNR) enhancement layers, redundant slices, redundant pictures, forward error correction codes, and so on.

Figure 7:
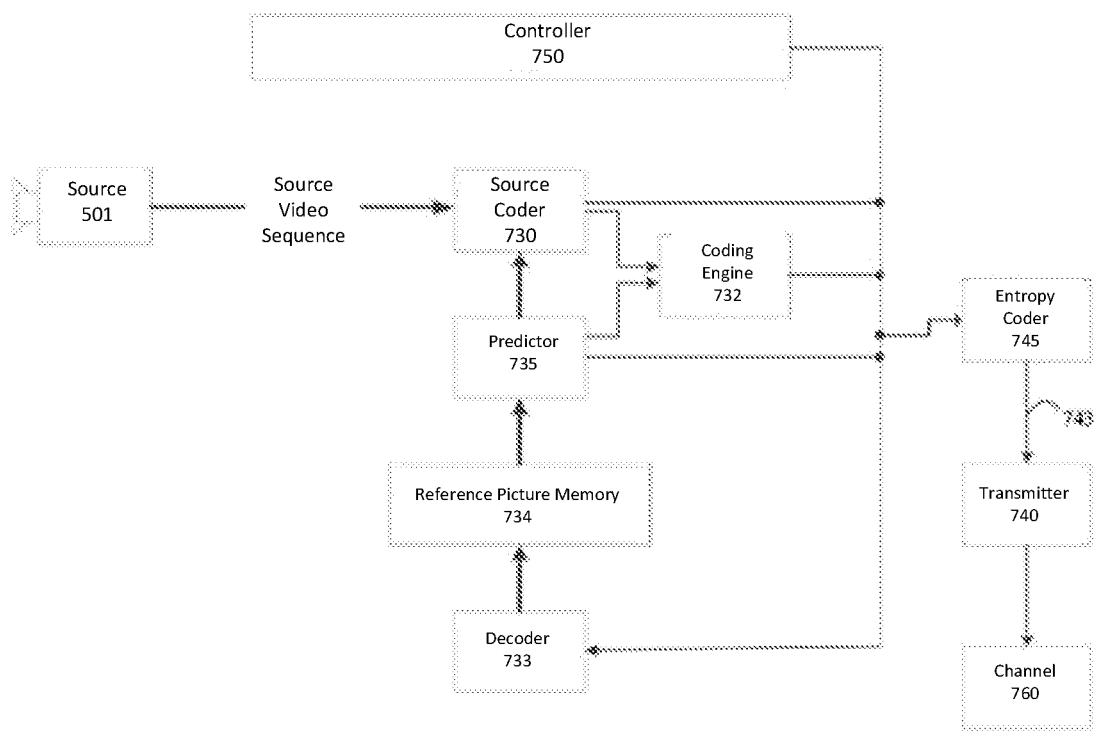
FIG. 7 is a block diagram of a video encoder, according to an embodiment.

FIG. 7 may be a functional block diagram of a video encoder (503) according to an embodiment of the present disclosure.

The encoder (503) may receive video samples from a video source (501) (that is not part of the encoder) that may capture video image(s) to be coded by the encoder (503).

The video source (501) may provide the source video sequence to be coded by the encoder (503) in the form of a digital video sample stream that may be of any suitable bit depth (for example: 8 bit, 10 bit, 12 bit, . . . ), any colorspace (for example, BT.601 Y CrCB, RGB, . . . ) and any suitable sampling structure (for example Y CrCb 4:2:0, Y CrCb 4:4:4). In a media serving system, the video source (501) may be a storage device storing previously prepared video. In a videoconferencing system, the video source (503) may be a camera that captures local image information as a video sequence. Video data may be provided as a plurality of individual pictures that impart motion when viewed in sequence. The pictures themselves may be organized as a spatial array of pixels, wherein each pixel may comprise one or more samples depending on the sampling structure, color space, etc. in use. A person skilled in the art may readily understand the relationship between pixels and samples. The description below focuses on samples.

According to an embodiment, the encoder (503) may code and compress the pictures of the source video sequence into a coded video sequence (743) in real time or under any other time constraints as required by the application. Enforcing appropriate coding speed is one function of Controller (750). Controller (750) controls other functional units as described below and is functionally coupled to these units. The coupling is not depicted for clarity. Parameters set by controller may include rate control related parameters (picture skip, quantizer, lambda value of rate-distortion optimization techniques, etc.), picture size, group of pictures (GOP) layout, maximum motion vector search range, and so forth. A person skilled in the art may readily identify other functions of controller (750) as they may pertain to video encoder (503) optimized for a certain system design.

Some video encoders operate in what a person skilled in the art readily recognizes as a "coding loop." As an oversimplified description, a coding loop may consist of the encoding part of an encoder (730) ("source coder" henceforth) (responsible for creating symbols based on an input picture to be coded, and a reference picture(s)), and a (local) decoder (733) embedded in the encoder (503) that reconstructs the symbols to create the sample data that a (remote) decoder also would create (as any compression between symbols and coded video bit stream is lossless in the video compression technologies considered in the disclosed subject matter). That reconstructed sample stream is input to the reference picture memory (734). As the decoding of a symbol stream leads to bit-exact results independent of decoder location (local or remote), the reference picture buffer content is also bit exact between local encoder and remote encoder. In other words, the prediction part of an encoder "sees" as reference picture samples exactly the same sample values as a decoder would "see" when using prediction during decoding. This fundamental principle of reference picture synchronicity (and resulting drift, if synchronicity cannot be maintained, for example because of channel errors) is well known to a person skilled in the art.

The operation of the "local" decoder (733) may be the same as of a "remote" decoder (510), which has already been described in detail above in conjunction with FIG. 16. Briefly referring also to FIG. 16, however, as symbols are available and en/decoding of symbols to a coded video sequence by entropy coder (745) and parser (620) may be lossless, the entropy decoding parts of decoder (510), including channel (612), receiver (610), buffer (615), and parser (620) may not be fully implemented in local decoder (733).

An observation that may be made at this point is that any decoder technology except the parsing/entropy decoding that is present in a decoder also necessarily needs to be present, in substantially identical functional form, in a corresponding encoder. The description of encoder technologies may be abbreviated as they are the inverse of the comprehensively described decoder technologies. Only in certain areas a more detail description is required and provided below.

As part of its operation, the source coder (730) may perform motion compensated predictive coding, which codes an input frame predictively with reference to one or more previously-coded frames from the video sequence that were designated as "reference frames." In this manner, the coding engine (732) codes differences between pixel blocks of an input frame and pixel blocks of reference frame(s) that may be selected as prediction reference(s) to the input frame.

The local video decoder (733) may decode coded video data of frames that may be designated as reference frames, based on symbols created by the source coder (730). Operations of the coding engine (732) may advantageously be lossy processes. When the coded video data may be decoded at a video decoder (not shown in FIG. 17), the reconstructed video sequence typically may be a replica of the source video sequence with some errors. The local video decoder (733) replicates decoding processes that may be performed by the video decoder on reference frames and may cause reconstructed reference frames to be stored in the reference picture cache (734). In this manner, the encoder (503) may store copies of reconstructed reference frames locally that have common content as the reconstructed reference frames that will be obtained by a far-end video decoder (absent transmission errors).

The predictor (735) may perform prediction searches for the coding engine (732). That is, for a new frame to be coded, the predictor (735) may search the reference picture memory (734) for sample data (as candidate reference pixel blocks) or certain metadata such as reference picture motion vectors, block shapes, and so on, that may serve as an appropriate prediction reference for the new pictures. The predictor (735) may operate on a sample block-by-pixel block basis to find appropriate prediction references. In some cases, as determined by search results obtained by the predictor (735), an input picture may have prediction references drawn from multiple reference pictures stored in the reference picture memory (734).

The controller (750) may manage coding operations of the video coder (730), including, for example, setting of parameters and subgroup parameters used for encoding the video data.

Output of all aforementioned functional units may be subjected to entropy coding in the entropy coder (745). The entropy coder translates the symbols as generated by the various functional units into a coded video sequence, by loss-less compressing the symbols according to technologies known to a person skilled in the art as, for example Huffman coding, variable length coding, arithmetic coding, and so forth.

The transmitter (740) may buffer the coded video sequence(s) as created by the entropy coder (745) to prepare it for transmission via a communication channel (760), which may be a hardware/software link to a storage device which would store the encoded video data. The transmitter (740) may merge coded video data from the video coder (730) with other data to be transmitted, for example, coded audio data and/or ancillary data streams (sources not shown).

The controller (750) may manage operation of the encoder (503). During coding, the controller (750) may assign to each coded picture a certain coded picture type, which may affect the coding techniques that may be applied to the respective picture. For example, pictures often may be assigned as one of the following frame types:

An Intra Picture (I picture) may be one that may be coded and decoded without using any other frame in the sequence as a source of prediction. Some video codecs allow for different types of Intra pictures, including, for example Independent Decoder Refresh Pictures. A person skilled in the art is aware of those variants of I pictures and their respective applications and features.

A Predictive picture (P picture) may be one that may be coded and decoded using intra prediction or inter prediction using at most one motion vector and reference index to predict the sample values of each block.

A Bi-directionally Predictive Picture (B Picture) may be one that may be coded and decoded using intra prediction or inter prediction using at most two motion vectors and reference indices to predict the sample values of each block. Similarly, multiple-predictive pictures may use more than two reference pictures and associated metadata for the reconstruction of a single block.

Source pictures commonly may be subdivided spatially into a plurality of sample blocks (for example, blocks of 4×4, 8×8, 4×8, or 16×16 samples each) and coded on a block-by-block basis. Blocks may be coded predictively with reference to other (already coded) blocks as determined by the coding assignment applied to the blocks' respective pictures. For example, blocks of I pictures may be coded non-predictively or they may be coded predictively with reference to already coded blocks of the same picture (spatial prediction or intra prediction). Pixel blocks of P pictures may be coded non-predictively, via spatial prediction or via temporal prediction with reference to one previously coded reference pictures. Blocks of B pictures may be coded non-predictively, via spatial prediction or via temporal prediction with reference to one or two previously coded reference pictures.

The video coder (503) may perform coding operations according to a predetermined video coding technology or standard, such as H.265 HEVC. In its operation, the video coder (503) may perform various compression operations, including predictive coding operations that exploit temporal and spatial redundancies in the input video sequence. The coded video data, therefore, may conform to a syntax specified by the video coding technology or standard being used.

In an embodiment, the transmitter (740) may transmit additional data with the encoded video. The video coder (730) may include such data as part of the coded video sequence. Additional data may comprise temporal/spatial/SNR enhancement layers, other forms of redundant data such as redundant pictures and slices, Supplementary Enhancement Information (SEI) messages, Visual Usability Information (VUI) parameter set fragments, and so on.

The present disclosure is directed to several block partitioning methods wherein motion information is considered during a tree split for video encoding. More specifically, the techniques in this disclosure relate to tree splitting methods for flexible tree structures based on motion field information. The techniques proposed in this disclosure may be applied to both homogenous and heterogeneous derived motion fields.

Derived motion field of a block is defined as homogenous if the derived motion field is available for all sub-blocks in the block and all motion vectors in the derived motion field are similar, such as, the motion vectors share the same reference frame and the absolute differences among motion vectors are all below a certain threshold. The threshold may be signaled in bitstreams or predefined.

Derived motion field of a block is defined as heterogeneous if the derived motion field is available for all sub-blocks in the block and the motion vectors in the derived motion field are not similar, such as, at least one motion vector refers to a reference frame which is not referred by other motion vectors, or at least one absolute difference between two motion vectors in the field is larger than a signaled or predefined threshold.

While this disclosure has described several exemplary embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof.

What is claimed is:

1. A method for neural network (NN) based cross component prediction with low-bit precision during encoding or decoding, the method being executed by one or more processors, the method comprising:
reconstructing a chroma component based on a received luma component using a pre-trained deep neural network (DNN) cross component prediction (CCP) model for chroma prediction;
updating one or more parameters of the pre-trained DNN CCP model with low-bit precision;
generating an updated DNN CCP model for chroma prediction with low-bit precision based on at least one video sequence; and
using the updated DNN CCP model for cross component prediction of the at least one video sequence at reduced processing time, wherein the updated DNN CCP model uses a low-bit precision during inference, and wherein the low-bit precision format is one of FP16, INT8, INT4, INT2, and INT1.

2. The method of claim 1, wherein the updating the one or more parameters of the pre-trained DNN CCP model comprises updating one or more parameters of the pre-trained DNN CCP model with low-bit precision.

3. The method of claim 2, wherein the updating the one or more parameters of the pre-trained DNN CCP model comprises updating the one or more parameters from among one or more layers of the pre-trained DNN CCP model with low-bit precision.

4. The method of claim 1, wherein the updating the one or more parameters of the pre-trained DNN CCP model for chroma prediction with low-bit precision further comprises updating based on a plurality of video sequences.

5. The method of claim 2, wherein the one or more parameters being updated with low-bit precision comprises one or more bias parameters.

6. The method of claim 2, wherein the one or more parameters being updated with low-bit precision comprises one or more weight parameters.

7. The method of claim 2, wherein the one or more parameters being updated with low-bit precision comprises joint updating of one or more bias parameters and one or more weight parameters.

8. The method of claim 3, wherein the one or more layers comprises one or more convolutional layers of the pre-trained DNN CCP model.

9. The method of claim 3, wherein the one or more layers comprises a set of final layers of the pre-trained DNN CCP model.

10. The method of claim 3, wherein the one or more layers comprises all layers of the pre-trained DNN CCP model having a same layer property.

11. The method of claim 1, wherein quality computation of the reconstructed chroma component is based on one or more chroma components from other prediction modes and an original chroma component associated with the reconstructed chroma component.

12. The method of claim 1, wherein the updating further comprises:
calculating a first compression performance of the updated DNN CCP model including one or more parameters updated with low-bit precision;
calculating a second compression performance of the pre-trained DNN CCP model including one or more pertained parameters; and
based on a comparison of the first compression performance and the second compression performance being higher than a threshold, determine whether to update the pre-trained DNN CCP model to include the one or more parameters updated with low-bit precision.

13. An apparatus for neural network (NN) based cross component prediction with low-bit precision during encoding or decoding, the apparatus comprising:
at least one memory configured to store program code; and
at least one processor configured to read the program code and operate as instructed by the program code, the program code comprising:
reconstructing code configured to cause the at least one processor to reconstruct a chroma component based on a received luma component using a pre-trained DNN CCP model for chroma prediction;
updating code configured to cause the at least one processor to update one or more parameters of the pre-trained DNN CCP model with low-bit precision;
generating code configured to cause the at least one processor to generate an updated DNN CCP model for chroma prediction with low-bit precision based on at least one video sequence; and
predicting code configured to cause the at least one processor to use the updated DNN CCP model for cross component prediction of the at least one video sequence at reduced processing time, wherein the updated DNN CCP model uses a low-bit precision during inference, and wherein the low-bit precision format is one of FP16, INT8, INT4, INT2, and INT1.

14. The apparatus of claim 13, wherein the updating the one or more parameters of the pre-trained DNN CCP model comprises updating one or more parameters of the pre-trained DNN CCP model with low-bit precision.

15. The apparatus of claim 14, wherein the updating the one or more parameters of the pre-trained DNN CCP model comprises updating the one or more parameters from among one or more layers of the pre-trained DNN CCP model with low-bit precision.

16. The apparatus of claim 14, wherein the one or more parameters being updated with low-bit precision comprises joint updating of one or more bias parameters and one or more weight parameters.

17. The apparatus of claim 15, wherein the one or more layers comprises one or more convolutional layers, a set of final layers, or all layers of the pre-trained DNN CCP model having a same layer property.

18. The apparatus of claim 13, wherein a quality computation of the reconstructed chroma component is based on one or more chroma components from other prediction modes and an original chroma component associated with the reconstructed chroma component.

19. A non-transitory computer readable medium storing instructions that, when executed by at least one processor for neural network (NN) based cross component prediction with low-bit precision during encoding or decoding, cause the at least one processor to:
reconstruct a chroma component based on a received luma component using a pre-trained DNN CCP model for chroma prediction;
update one or more parameters of the pre-trained DNN CCP model with low-bit precision;

generate an updated DNN CCP model for chroma prediction with low-bit precision based on at least one video sequence; and use the updated DNN CCP model for cross component prediction of the at least one video sequence at reduced processing time, wherein the updated DNN CCP model uses a low-bit precision during inference, and wherein the low-bit precision format is one of FP16, INT8, INT4, INT2, and INT1.

20. The non-transitory computer readable medium of claim 19, wherein the updating the one or more parameters of the pre-trained DNN CCP model comprises updating one or more parameters from among one or more layers of the pre-trained DNN CCP model with low-bit precision.

* * * * *